(12) United States Patent
Tanaka

(10) Patent No.: US 10,507,616 B2
(45) Date of Patent: Dec. 17, 2019

(54) THREE-DIMENSIONAL OBJECT-MANUFACTURING APPARATUS, THREE-DIMENSIONAL OBJECT-MANUFACTURING METHOD, AND PROGRAM

(71) Applicant: KEIO UNIVERSITY, Minato-ku, Tokyo (JP)

(72) Inventor: Hiroya Tanaka, Kanagawa (JP)

(73) Assignee: KEIO UNIVERSITY, Tokyo (JP)

( * ) Notice: Subject to any disclaimer, the term of this patent is extended or adjusted under 35 U.S.C. 154(b) by 0 days.

(21) Appl. No.: 15/561,765

(22) PCT Filed: Mar. 25, 2016

(86) PCT No.: PCT/JP2016/059676
§ 371 (c)(1),
(2) Date: Sep. 26, 2017

(87) PCT Pub. No.: WO2016/153047
PCT Pub. Date: Sep. 29, 2016

(65) Prior Publication Data
US 2018/0079138 A1    Mar. 22, 2018

(30) Foreign Application Priority Data
Mar. 26, 2015    (JP) ................................ 2015-064346

(51) Int. Cl.
*G06T 17/00* (2006.01)
*B29C 64/386* (2017.01)
(Continued)

(52) U.S. Cl.
CPC ............ *B29C 64/386* (2017.08); *B33Y 50/00* (2014.12); *G05B 19/4099* (2013.01); *G05B 2219/35134* (2013.01); *G05B 2219/49007* (2013.01)

(58) Field of Classification Search
CPC ... B29C 64/386; B29C 67/00; G05B 19/4099; G05B 2219/35134; G05B 2219/49007; B33Y 50/00
See application file for complete search history.

(56) References Cited

U.S. PATENT DOCUMENTS

2012/0299917 A1    11/2012    Kumar
2014/0330421 A1    11/2014    Wu
2017/0129187 A1    5/2017    Hashimoto et al.

FOREIGN PATENT DOCUMENTS

JP    2013086289 A    5/2013

OTHER PUBLICATIONS

International Search Report (ISR) and Written Opinion dated May 31, 2016 issued in International Application No. PCT/JP2016/059676.

(Continued)

*Primary Examiner* — Charles R Kasenge
(74) *Attorney, Agent, or Firm* — Holtz, Holtz & Volek PC

(57) ABSTRACT

In a three-dimensional object-manufacturing apparatus, a Hamilton path-calculating part generates, on the basis of three-dimensional shape data representing a shape of a three-dimensional object, a voxel model representing an internal structure for forming the three-dimensional object. The Hamilton path-calculating part also determines whether a Hamilton path can be established in the voxel model. When it is determined that a Hamilton path cannot be established in the voxel model, a subvoxel-generating part divides the voxels to generate subvoxels. The Hamilton path-calculating part establishes a Hamilton path in the voxel model. A tool path data-generating part generates a tool path for forming a forming material based on the established Hamilton path. A three-dimensional object- (Continued)

forming unit implements the forming of the three-dimensional object on the basis of the tool path.

12 Claims, 9 Drawing Sheets

(51) Int. Cl.
*B33Y 50/00* (2015.01)
*G05B 19/4099* (2006.01)

(56) References Cited

OTHER PUBLICATIONS

Cheung et al., "Programmable Assembly With Universally Foldable Strings (Moteins)," IEEE Transaction on Robotics, Aug. 2011, vol. 27, No. 4, pp. 718-729.

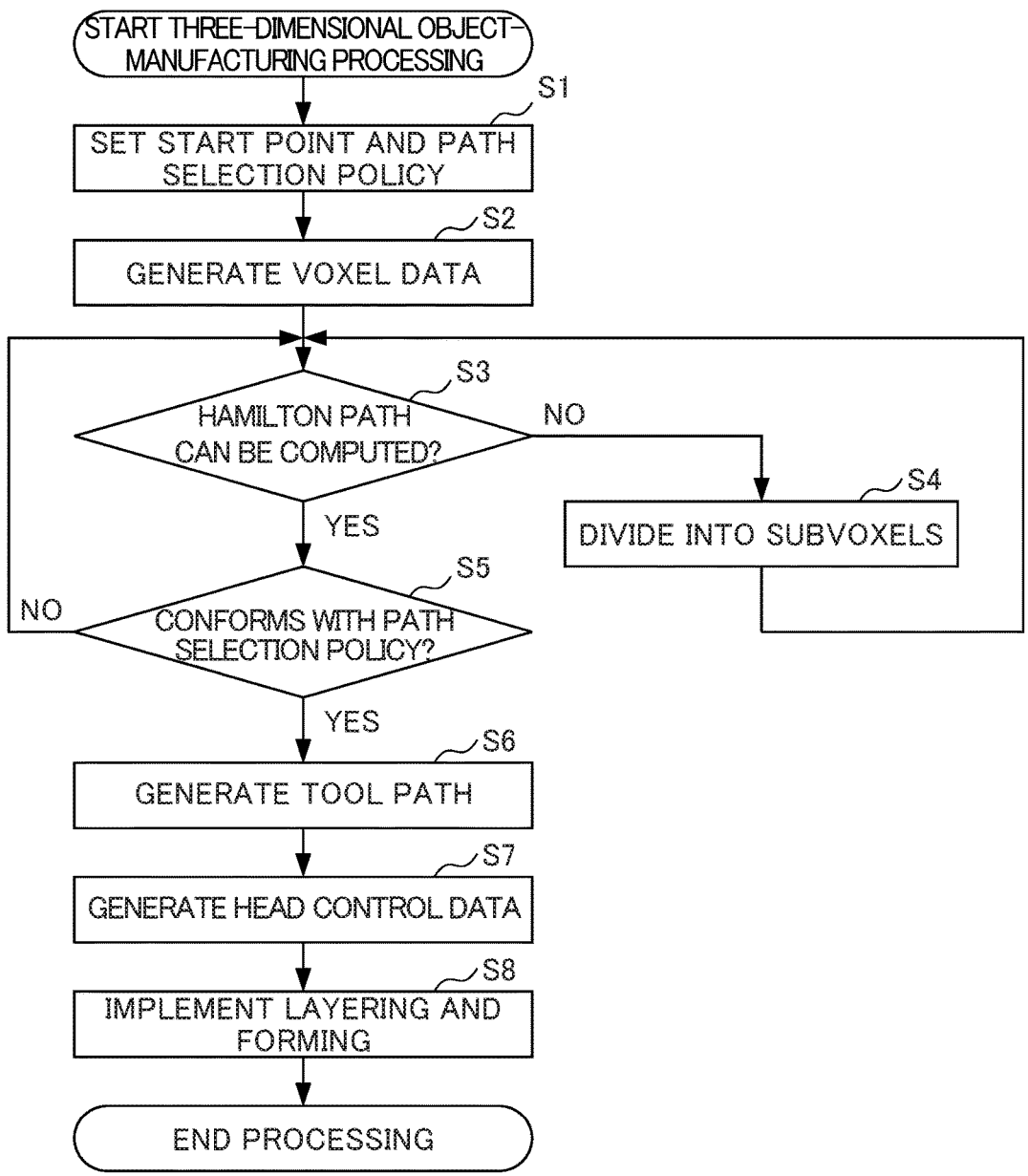

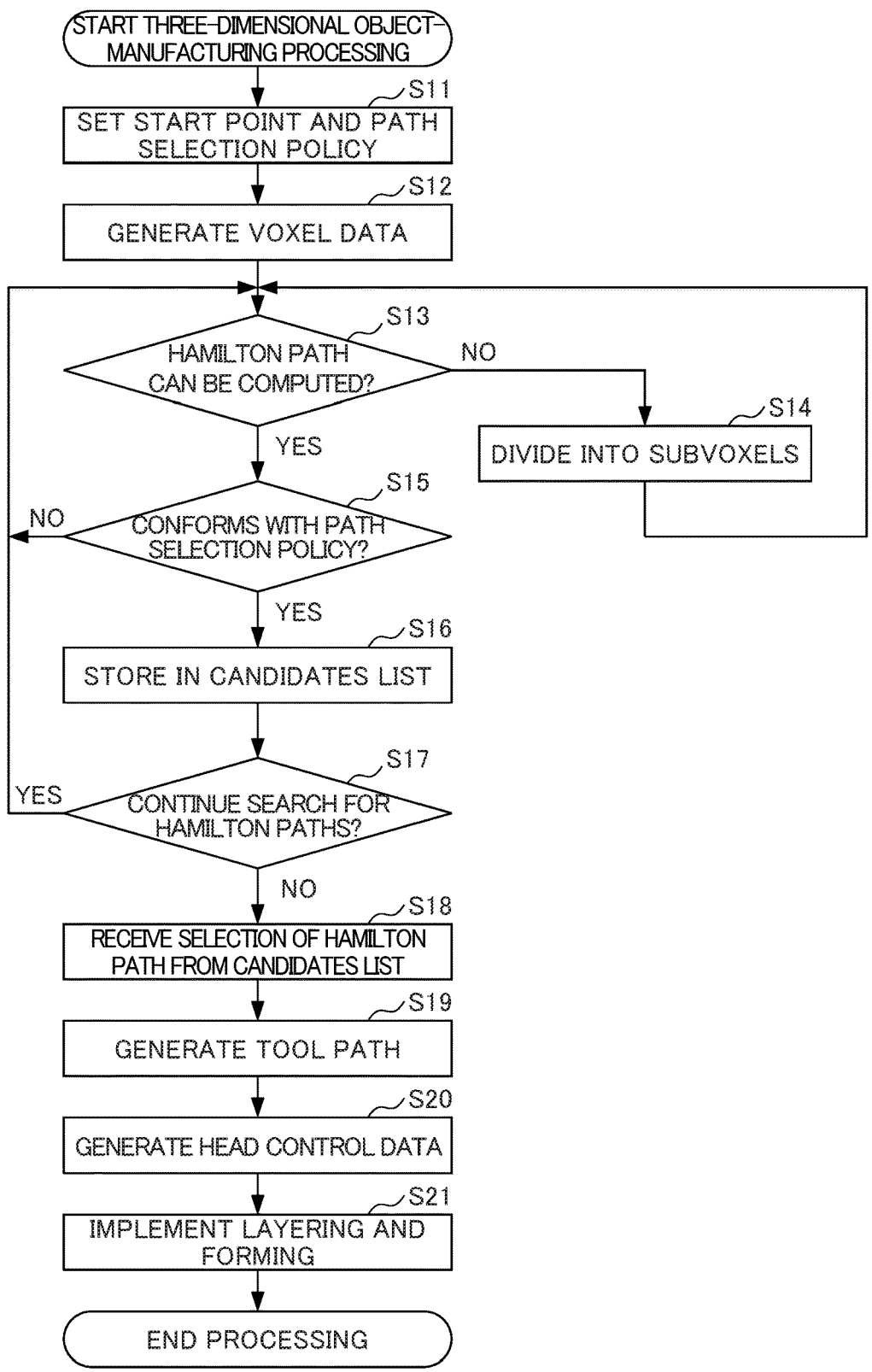

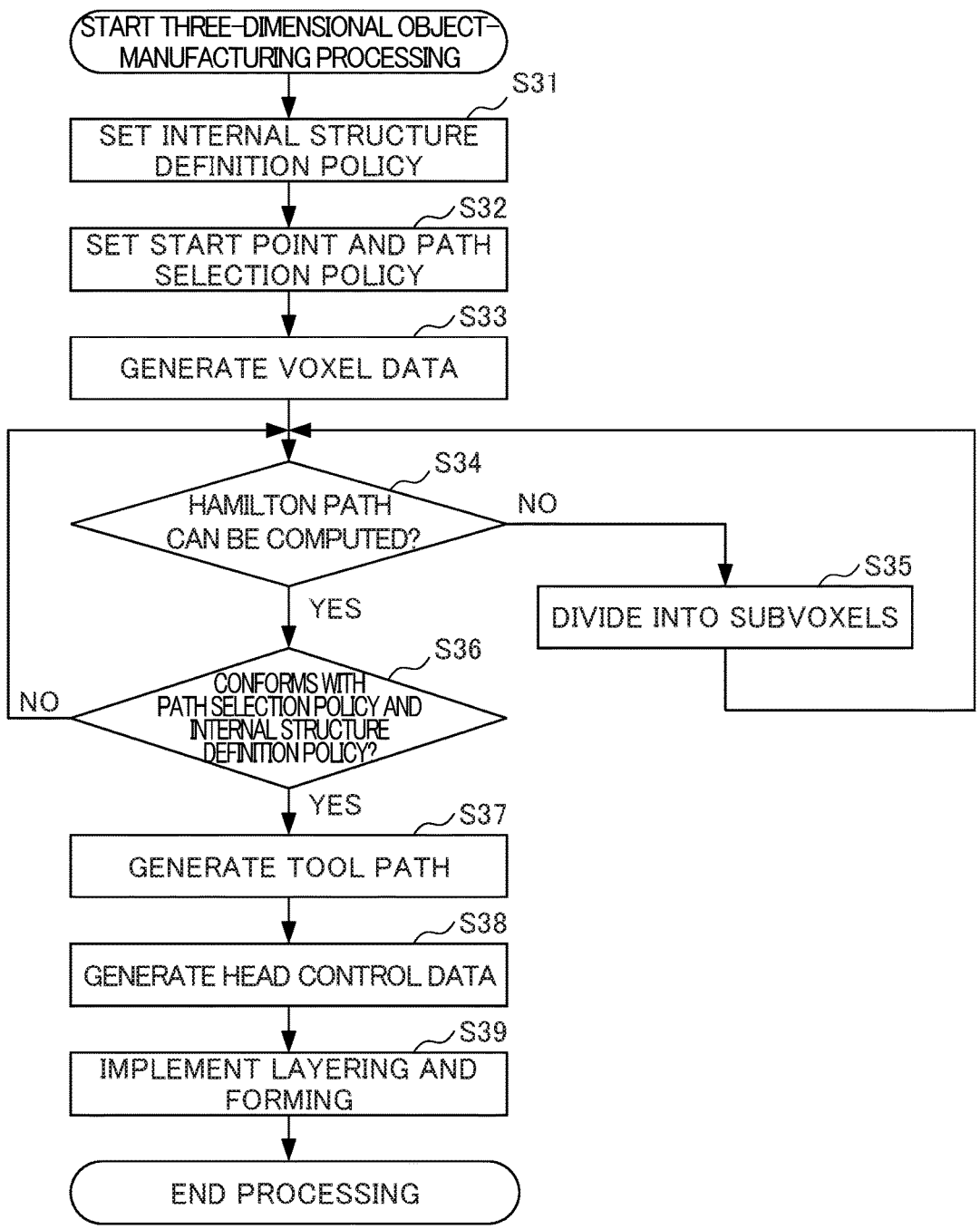

THREE-DIMENSIONAL OBJECT-MANUFACTURING APPARATUS, THREE-DIMENSIONAL OBJECT-MANUFACTURING METHOD, AND PROGRAM

TECHNICAL FIELD

The present invention relates to a three-dimensional object-manufacturing apparatus, a three-dimensional object-manufacturing method, and a storage medium.

BACKGROUND ART

Heretofore, in a 3D printing system that manufactures a three-dimensional object, a standard input file format that is commonly employed is the STL format, in which a surface (the surface of a three-dimensional object) is approximated with a mesh of polygons. During output of a three-dimensional form, slice data that represents a tool path of a 3D printer head is generated from the STL format in computer-aided manufacturing (CAM) software. When a tool path is being generated, the data is first divided into a shell region corresponding to an outermost shell and an interior region. In, for example, filling processing for the interior region of a formed object, total filling, a honeycomb structure or the like is selected from patterns prepared in advance in the software. This technique reduces consumption of material while producing the form of the surface of the formed object. A technology relating to this 3D printing is recited in, for example, Patent Document 1.

Patent Document 1: Japanese Unexamined Patent Application, Publication No. 2013-086289

DISCLOSURE OF THE INVENTION

However, when a three-dimensional formed object with an internal structure in which cavities are formed, materials are mixed or the like is to be outputted by a 3D printer, a method is required for generating a tool path in a new perspective which cannot be conceptually addressed by the conventional STL format, slice data and the like.

Means for Solving the Problems

A three-dimensional object-manufacturing apparatus according to an aspect of the present invention includes: a voxel model-generating unit that, on the basis of three-dimensional shape data representing the shape of a three-dimensional object, generates a voxel model representing internal structure for forming the three-dimensional object; a judging unit that judges whether or not a Hamilton path can be established for the voxel model generated by the voxel model-generating unit; a subvoxel-generating unit that, when it is judged by the judging unit that a Hamilton path cannot be established for the voxel model, divides voxels of the voxel model to generate subvoxels; a Hamilton path-establishing unit that establishes a Hamilton path for the voxel model; a tool path-generating unit that generates a tool path for forming a forming material on the basis of the Hamilton path established by the Hamilton path-establishing unit; and a three-dimensional object-forming unit that implements forming of the three-dimensional object on the basis of the tool path generated by the tool path-generating unit.

Effects of the Invention

According to the present invention, a tool path for outputting a three-dimensional formed object in a 3D printer may be generated more appropriately.

BRIEF DESCRIPTION OF THE DRAWINGS

FIG. 4 is a flowchart depicting a flow of three-dimensional object-manufacturing processing that is executed by the three-dimensional object-manufacturing apparatus according to a first embodiment.

FIG. 5 is a flowchart depicting a flow of three-dimensional object-manufacturing processing that is executed by the three-dimensional object-manufacturing apparatus according to a second embodiment.

FIG. 9 is a flowchart depicting a flow of three-dimensional object-manufacturing processing that is executed by the three-dimensional object-manufacturing apparatus according to the fourth embodiment.

PREFERRED MODE FOR CARRYING OUT THE INVENTION

In the following, embodiments of the present invention are explained using the attached drawings.

First Embodiment

—Structure—

Figure 1:
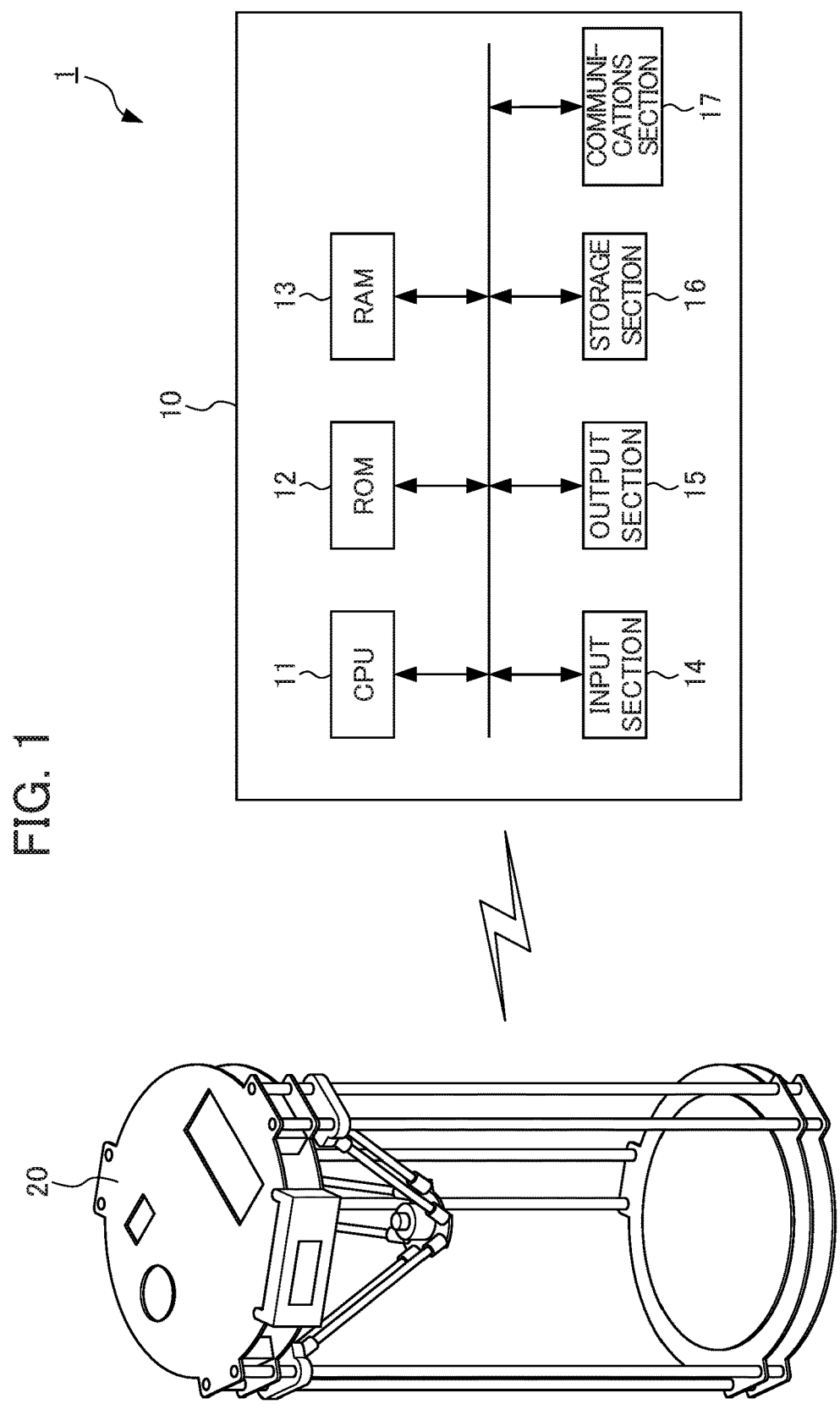
FIG. 1 is a schematic diagram illustrating a hardware configuration of a three-dimensional object-manufacturing apparatus according to an embodiment of the present invention.

FIG. 1 is a schematic diagram illustrating a hardware configuration of a three-dimensional object-manufacturing apparatus 1 according to an embodiment of the present invention. As illustrated in FIG. 1, the three-dimensional object manufacturing apparatus 1 is equipped with a three-dimensional object-forming data generation unit 10 and a three-dimensional object forming unit 20. The three-dimensional object-forming data generation unit 10 is structured by information processing equipment such as a personal computer (PC), an embedded computer or the like. In the present embodiment, the three-dimensional object-forming data generation unit 10 is structured by a PC.

The three-dimensional object-forming data generation unit 10 generates slice data representing a tool path of a 3D printer head of the three-dimensional object-forming unit 20 from computer-aided design (CAD) data, which is design data of a three-dimensional object. During this, the three-dimensional object-forming data generation unit 10 generates a voxel model representing internal structure of the three-dimensional formed object from the CAD data, and computes a Hamilton path to render the voxel model in a single pass with a 3D printer head 222 (described below). If a Hamilton path of the voxel model cannot be calculated (i.e., the voxel model cannot be rendered in a single pass), the three-dimensional object-forming data generation unit 10 divides the voxels to generate subvoxels and hence computes a Hamilton path. In regard to the matter of finding a Hamilton path that passes through voxels in a single pass, it is known that rendering in a single pass is always possible if each voxel is divided in four (for example, see the following document: "Programmable Assembly With Universally Foldable Strings (Moteins)", IEEE TRANSACTIONS ON ROBOTICS, Vol. 27, No. 4, August 2011).

In specific terms, the three-dimensional object-forming data generation unit 10 is equipped with a central processing unit (CPU) 11, a read-only memory (ROM) 12, a random access memory (RAM) 13, an input section 14, an output section 15, a storage section 16 and a communications section 17.

The CPU 11 executes various processes in accordance with a program stored in the ROM 12 or the storage section 16. The ROM 12 stores various programs for controlling the three-dimensional object-manufacturing apparatus 1. Data and suchlike for execution of the various processes by the CPU 11 is stored in the RAM 13.

The input section 14 is constituted with a keyboard and a pointing device such as a mouse or the like. The input section 14 inputs various kinds of information in accordance with instruction operations by a user. The output section 15 is constituted with a display and a speaker or the like. The output section 15 outputs displays of information, voice messages and the like in accordance with control by the CPU. The storage section 16 is constituted with a storage device such as a hard disc or the like. The storage section 16 stores various kinds of data, programs and the like used in the three-dimensional object-manufacturing apparatus 1. The communications section 17 implements communications with other devices via a communications cable, such as a universal serial bus (USB) cable or the like, a communications network, such as the Internet or the like, or the like.

The three-dimensional object-forming data generation unit 10 repeatedly searches for a tool path until a tool path that conforms with a specified path selection policy is found. When a tool path that conforms with the path selection policy is found, the three-dimensional object-forming data generation unit 10 uses this tool path to generate control data for controlling the 3D printer head 222.

The three-dimensional object-forming unit 20 is constituted by a 3D printer of a fused deposition modeling (FDM) type or a photofabrication type. In the present embodiment, the three-dimensional object-forming unit 20 is an FDM-type 3D printer. On the basis of the control data generated by the three-dimensional object-forming data generation unit 10, the three-dimensional object-forming unit 20 ejects forming material from the 3D printer head 222 while tracing the Hamilton path and outputs a three-dimensional formed object (manufactures a three-dimensional object). The physical size of voxels rendered by the three-dimensional object-forming unit 20 is set by a nozzle diameter of the 3D printer head 222 and adjustment of an ejection amount of the forming material.

—Functional Structures of the Three-Dimensional Object Manufacturing Apparatus 1—

Figure 2:
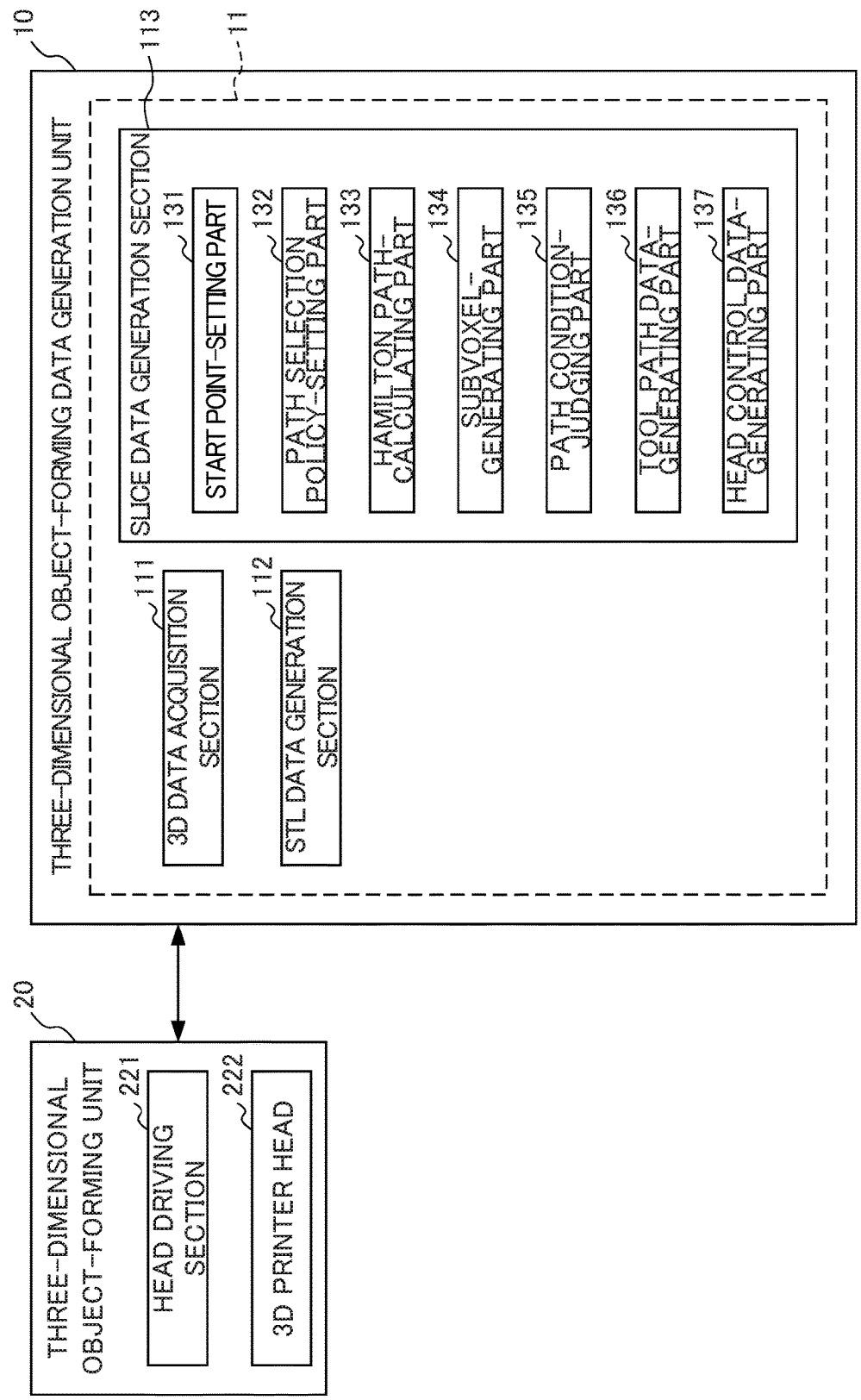
FIG. 2 is a block diagram illustrating functional structures of the three-dimensional object-manufacturing apparatus.

Now, functional structures of the three-dimensional object-manufacturing apparatus 1 are described. FIG. 2 is a block diagram illustrating the functional structures of the three-dimensional object-manufacturing apparatus 1. As illustrated in FIG. 2, the three-dimensional object-forming data generation unit 10 of the three-dimensional object-manufacturing apparatus 1 is equipped with a 3D data acquisition section 111, an STL data generation section 112 and a slice data generation section 113. The three-dimensional object-forming unit 20 is equipped with a head driving section 221 and the 3D printer head 222.

The 3D data acquisition section 111 acquires CAD data created at the three-dimensional object-manufacturing apparatus 1 or CAD data transmitted from other equipment via an unillustrated network or the like. On the basis of the CAD data acquired by the 3D data acquisition section 111, the STL data generation section 112 generates data in the STL format (STL data) in which a surface (the surface of the three-dimensional object) is approximated with a mesh of polygons On the basis of the STL data generated by the STL data generation section 112, the slice data generation section 113 generates slice data representing a tool path of the 3D printer head 222. To be specific, the slice data generation section 113 is equipped with a start point-setting part 131, a path selection policy-setting part 132, a Hamilton path-calculating part 133, a subvoxel-generating part 134, a path condition-judging part 135, a tool path data-generating part 136 and a head control data-generating part 137.

The start point-setting part 131 sets the position of a start point at which the ejection of forming material by the 3D printer head 222 starts. In the present embodiment, the start point-setting part 131 sets the position of the start point in accordance with a command received from a user. The path selection policy-setting part 132 sets a policy for selecting a path (a path selection policy) along which the 3D printer head 222 ejects the forming material when forming the three-dimensional object. Three-dimensional objects represented by the same STL data when the three-dimensional objects are formed may differ in physical properties of the three-dimensional formed objects depending on what kind of path the 3D printer head 222 ejects the forming material along (that is, what kind of tool path is traced).

To be specific, a direction of the path along which the 3D printer head 222 ejects the forming material (a direction along the tool path) has the physical properties of tensile and compression strength being higher but cracking being more likely. Meanwhile, a direction in which paths along which the 3D printer head 222 ejects the forming material are layered (a direction orthogonal to the tool path) has the physical properties of tensile and compression strength being lower but cracking being less likely. The setting of the path selection policy sets a policy for selecting directions of the tool path with consideration to these physical properties. For example, the path selection policy is set such that "the tool path is in horizontal directions in a designated region" or "tensile strength is prioritized in a designated region". In the present embodiment, the path selection policy-setting part 132 receives a path selection policy command from a user and sets the path selection policy for an arbitrary region of the three-dimensional formed object (a part or all of the three-dimensional object). Accordingly, the physical properties of the three-dimensional object that is manufactured may be specified appropriately. In the setting of the path selection policy, the tool path may be selected arbitrarily: a path may be selected that traverses an internal cavity of the three-dimensional formed object; and a path may be selected that avoids slicing in the horizontal direction through surface shapes (broad peaks of large recesses and protrusions, and the like) with large inclinations (for example, 45° or more), such that these shapes are formed more smoothly.

On the basis of STL data generated by the STL data generation section 112, the Hamilton path-calculating part 133 generates data of a voxel model representing internal structure of the three-dimensional formed object. Then, the Hamilton path-calculating part 133 computes a Hamilton path that traces through each voxel of the generated voxel model. If the Hamilton path-calculating part 133 determines that a Hamilton path tracing through each voxel represented by the voxel model cannot be computed (that is, it is not possible to trace through each voxel in a single pass), the Hamilton path-calculating part 133 outputs a processing request to the subvoxel-generating part 134 to divide voxels into subvoxels. In the present embodiment, if the Hamilton path-calculating part 133 cannot compute a Hamilton path that traces through each voxel represented by the voxel model, the Hamilton path-calculating part 133 outputs a processing request to divide all the voxels of the voxel model into subvoxels.

When a processing request to divide voxels into subvoxels is inputted from the Hamilton path-calculating part 133, the subvoxel-generating part 134 executes processing to divide the voxels into subvoxels and outputs the processing results to the Hamilton path-calculating part 133 to serve as new voxel data. In the present embodiment, the subvoxel-generating part 134 divides all the voxels of the voxel model in four (for example, dividing each voxel in half longitudinally and laterally in a plan view) to form the subvoxels.

Figure 3A:
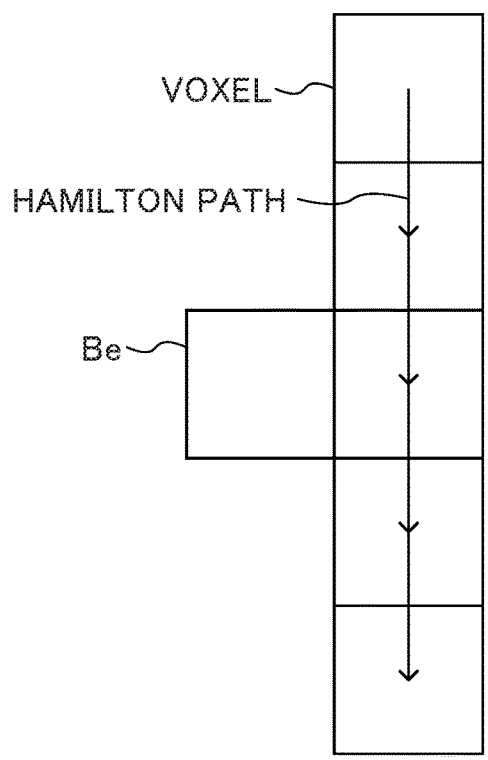
FIG. 3A and FIG. 3B are a schematic diagram illustrating a situation in which voxels are divided into subvoxels.
Figure 3B:
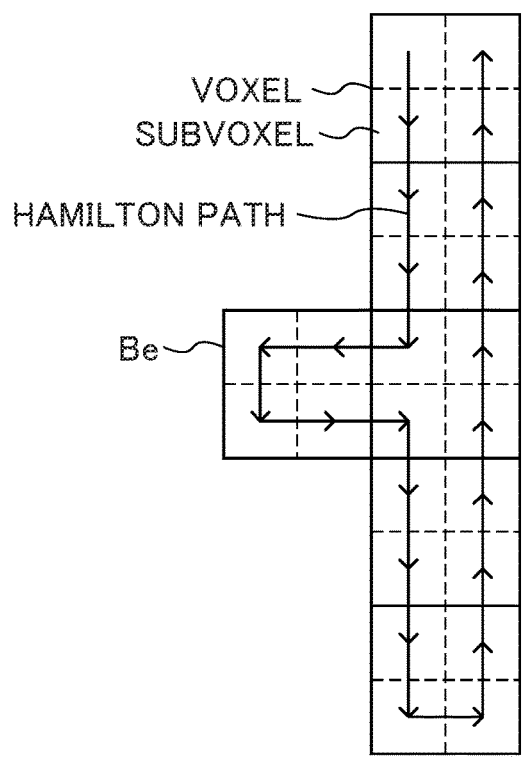

FIG. 3A and FIG. 3B are a schematic diagram illustrating a situation in which voxels are divided into subvoxels. As shown in FIG. 3A, when a single voxel Be branches off from the path, the voxel Be cannot be rendered in a single pass. Therefore, a Hamilton path cannot be established for the voxel data. As shown in FIG. 3B, a path that can circulate through the branching voxel Be is formed by dividing each voxel in four. Returning to FIG. 2, the path condition-judging part 135 judges whether or not a Hamilton path computed by the Hamilton path-calculating part 133 conforms with the path selection policy set by the path selection policy-setting part 132. To be specific, the path condition-judging part 135 judges whether or not the Hamilton path computed by the Hamilton path-calculating part 133 conforms with directions of the tool path set in the path selection policy. If the path condition-judging part 135 judges that the Hamilton path computed by the Hamilton path-calculating part 133 does not conform with the directions of the tool path set in the path selection policy, the path condition-judging part 135 outputs a request to the Hamilton path-calculating part 133 to recompute the Hamilton path. By this processing, a single Hamilton path conforming with the path selection policy is found.

On the basis of the Hamilton path that has been judged to conform with the path selection policy by the path condition-judging part 135, the tool path data-generating part 136 generates slice data representing a tool path of the 3D printer head 222. The slice data generated by the tool path data-generating part 136 represents a Hamilton path that satisfies path selection conditions and can trace through the voxels in a single pass. On the basis of the slice data generated by the tool path data-generating part 136, the head control data-generating part 137 generates control data for the 3D printer head 222 (head control data) in order to layer and form respective portions of the three-dimensional formed object. In the present embodiment, the 3D printer head 222 is capable of rendering a tool path that includes both a tool path in horizontal directions (directions parallel to a stage) and a component in a vertical direction (a height direction relative to the stage). Therefore, control data for the 3D printer head 222 in the present embodiment may regulate movement in three dimensions rather than just movement in two directions within the horizontal plane.

On the basis of the control data generated by the head control data-generating part 137, the head driving section 221 of the three-dimensional object-forming unit 20 controls movements of the 3D printer head 222 in the horizontal directions and vertical direction and controls ejection amounts of the forming material from the nozzle. The 3D printer head 222 ejects the forming material from the nozzle in accordance with the control by the head driving section 221. Because the three-dimensional object-manufacturing apparatus 1 according to the present embodiment ejects the forming material while moving the 3D printer head 222 in the vertical direction as well as in the horizontal directions, a fan for cooling may be disposed at the periphery of the stage and hardening of the forming material may be accelerated.

—Operation—

Now, operations of the three-dimensional object-manufacturing apparatus 1 are described. FIG. 4 is a flowchart depicting a flow of three-dimensional object-manufacturing processing that is executed by the three-dimensional object-manufacturing apparatus 1. The three-dimensional object-manufacturing processing is started in response to an operation commanding the manufacture of a three-dimensional object being performed at the three-dimensional object-manufacturing apparatus 1. In step S1, the start point-setting part 131 sets the position of a start point at which the 3D printer head 222 starts the ejection of forming material. In addition, the path selection policy-setting part 132 sets the path selection policy. In step S2, on the basis of STL data generated by the STL data generation section 112, the Hamilton path-calculating part 133 generates voxel data representing internal structure of the three-dimensional formed object.

In step S3, the Hamilton path-calculating part 133 makes a determination as to whether a Hamilton path that traces through each voxel of the voxel data can be computed. If it is not possible to compute a Hamilton path that traces through each voxel of the generated voxel data, the result of the determination in step S3 is "NO" and the processing advances to step S4. In this case, a processing request to divide the voxels into subvoxels is outputted from the Hamilton path-calculating part 133 to the subvoxel-generating part 134. Alternatively, if it is possible to compute a Hamilton path that traces through each voxel in the generated voxel data, the result of the determination in step S3 is "YES" and the processing advances to step S5.

In step S4, the subvoxel-generating part 134 executes processing to divide the voxels into subvoxels and outputs the processing results to the Hamilton path-calculating part 133 to serve as new voxel data. After step S4, the processing returns to step S3. In step S5, the path condition-judging part 135 makes a determination as to whether the Hamilton path computed by the Hamilton path-calculating part 133 conforms with the path selection policy set by the path selection policy-setting part 132. If the Hamilton path computed by the Hamilton path-calculating part 133 does not conform with the path selection policy set by the path selection policy-setting part 132, the result of the determination in step S5 is "NO" and the processing returns to step S3. Alternatively, if the Hamilton path computed by the Hamilton path-calculating part 133 conforms with the path selection policy set by the path selection policy-setting part 132, the result of the determination in step S5 is "YES" and the processing advances to step S6.

In step S6, on the basis of the Hamilton path that has been judged by the path condition-judging part 135 to conform with the path selection policy, the tool path data-generating part 136 generates slice data representing a tool path of the 3D printer head 222. In step S7, on the basis of the slice data generated by the tool path data-generating part 136, the head control data-generating part 137 generates control data (head control data) for the 3D printer head 222 in order to layer and form respective portions of the three-dimensional formed object. In step S8, on the basis of the control data generated by the head control data-generating part 137, the head driving section 221 controls movements of the 3D printer head 222 in the horizontal directions and the vertical direction and controls ejection amounts of the forming material from the nozzle, implementing layering and forming of the three-dimensional formed object by the 3D printer head 222. After step S8, the three-dimensional object-manufacturing processing ends.

As described above, according to the three-dimensional object-manufacturing apparatus 1 relating to the present embodiment, a Hamilton path that renders a voxel model representing internal structure of a three-dimensional formed object in one pass is searched for, and when a Hamilton path that conforms with a set path selection policy is found, control data that controls the 3D printer head 222 is generated on the basis of a tool path that is generated on the basis of this Hamilton path. Therefore, a tool path for outputting a three-dimensional formed object with physical properties specified by the path selection policy may be generated. Thus, a tool path for outputting a three-dimensional formed object in a 3D printer more appropriately may be generated.

Moreover, according to the three-dimensional object-manufacturing apparatus 1, when a Hamilton path is being searched for, if the voxel model is a voxel model for which a Hamilton path cannot be computed, the voxels are divided into subvoxels. Thus, because various voxel models can be converted into voxel models for which Hamilton paths can be computed, tool paths for outputting three-dimensional formed objects in a 3D printer more appropriately may be assuredly generated.

Second Embodiment

Now, a second embodiment of the present invention is described. The three-dimensional object-manufacturing apparatus 1 according to the second embodiment is equipped with a similar hardware structure to the three-dimensional object-manufacturing apparatus 1 according to the first embodiment, but differs in parts of the functional structures and the three-dimensional object-manufacturing processing. To be specific, the three-dimensional object-manufacturing apparatus 1 according to the first embodiment searches for one Hamilton path that conforms with the path selection policy, but the three-dimensional object-manufacturing apparatus 1 according to the second embodiment is capable of searching for all Hamilton paths that conform with the path selection policy and selecting a Hamilton path that a user considers most appropriate from all the Hamilton paths that are found. Below, mainly parts that are different from the first embodiment are described.

—Functional Structures of the Three-Dimensional Object Manufacturing Apparatus 1—

Functional structures of the three-dimensional object-manufacturing apparatus 1 according to the second embodiment are the same as functional structures in the first embodiment illustrated in FIG. 2, apart from functional structures of the Hamilton path-calculating part 133, the subvoxel-generating part 134, the path condition-judging part 135 and the tool path data-generating part 136 of the slice data generation section 113. In the second embodiment, the Hamilton path-calculating part 133 of the slice data generation section 113 generates data of a voxel model representing internal structure of a three-dimensional formed object on the basis of STL data generated by the STL data generation section 112. Then, the Hamilton path-calculating part 133 computes a Hamilton path that traces through each voxel of the generated voxel model. At this time, if the Hamilton path-calculating part 133 determines that a Hamilton path tracing through each voxel represented by the voxel model cannot be computed (that is, it is not possible to trace through each voxel in a single pass), the Hamilton path-calculating part 133 outputs a processing request to the subvoxel-generating part 134 to divide voxels into subvoxels. In the present embodiment, if the Hamilton path-calculating part 133 cannot compute a Hamilton path that traces through each voxel represented by the voxel model, the Hamilton path-calculating part 133 outputs a processing request to divide all the voxels of the voxel model into subvoxels.

The Hamilton path-calculating part 133 also makes a determination as to whether all Hamilton paths tracing through each voxel of the voxel model have been found (whether the search for Hamilton paths is to be continued). The Hamilton path-calculating part 133 repeats the search for Hamilton paths until the search for all Hamilton paths tracing through each voxel is completed.

When a processing request to divide voxels into subvoxels is inputted from the Hamilton path-calculating part 133, the subvoxel-generating part 134 executes processing to divide the voxels into subvoxels and outputs the processing results to the Hamilton path-calculating part 133 to serve as new voxel data. In the present embodiment, the subvoxel-generating part 134 divides all the voxels of the voxel model in four to form the subvoxels.

The path condition-judging part 135 judges whether or not a Hamilton path computed by the Hamilton path-calculating part 133 conforms with the path selection policy set by the path selection policy-setting part 132. To be specific, the path condition-judging part 135 judges whether or not the Hamilton path computed by the Hamilton path-calculating part 133 conforms with directions of the tool path set in the path selection policy. If the path condition-judging part 135 judges that the Hamilton path computed by the Hamilton path-calculating part 133 does not conform with the directions of the tool path set in the path selection policy, the path condition-judging part 135 outputs a request to the Hamilton path-calculating part 133 to recompute the Hamilton path. Alternatively, if the path condition-judging part 135 judges that the Hamilton path computed by the Hamilton path-calculating part 133 conforms with the directions of the tool path set in the path selection policy, the path condition-judging part 135 stores the Hamilton path in a candidates list of Hamilton paths. By this processing, one or more Hamilton paths conforming with the path selection policy are found.

The tool path data-generating part 136 receives a selection by a user of a Hamilton path from the candidates list of Hamilton paths that have been judged by the path condition-judging part 135 to conform with the path selection policy. The tool path data-generating part 136 reads the selected Hamilton path. On the basis of the Hamilton path selected by the user, the tool path data-generating part 136 generates slice data representing a tool path of the 3D printer head 222.

The slice data generated by the tool path data-generating part 136 represents a Hamilton path selected by the user from among Hamilton paths that satisfy path selection conditions and can trace through the voxels in a single pass.

—Operation—

Now, operations of the three-dimensional object-manufacturing apparatus 1 according to the second embodiment are described. FIG. 5 is a flowchart depicting a flow of three-dimensional object-manufacturing processing that is executed by the three-dimensional object-manufacturing apparatus 1 according to the second embodiment. The processing of step S11 to step S15 in FIG. 5 is the same as the processing of step S1 to step S5 in FIG. 4. In step S16, the path condition-judging part 135 stores a Hamilton path that has been determined to conform with the path selection policy in the candidates list of Hamilton paths.

In step S17, the Hamilton path-calculating part 133 makes a determination as to whether the search for Hamilton paths for the voxel data is to continue (whether the search for Hamilton paths that trace through each voxel has been completed). If the search for Hamilton paths in the voxel data is to be continued (if the search for Hamilton paths that trace through each voxel is not completed), the result of the determination in step S17 is "YES" and the processing returns to step S13. Alternatively, if the search for Hamilton paths in the voxel data is not to continue (if the search for Hamilton paths that trace through each voxel has been completed), the result of the determination in step S17 is "NO" and the processing advances to step S18.

In step S18, the tool path data-generating part 136 receives the selection by a user of a Hamilton path from the candidates list of Hamilton paths that have been determined by the path condition-judging part 135 to conform with the path selection policy, and the tool path data-generating part 136 reads the selected Hamilton path. In step S19, the tool path data-generating part 136 generates slice data representing a tool path of the 3D printer head 222 on the basis of the Hamilton path selected by the user. The processing of step S20 and step S21 is the same as the processing of step S7 and step S8 in FIG. 4.

As described above, according to the three-dimensional object-manufacturing apparatus 1 relating to the present embodiment, a Hamilton path that renders a voxel model representing internal structure of a three-dimensional formed object in one pass is searched for, and when a Hamilton path that conforms with a set path selection policy is found, that Hamilton path is stored in a candidates list of Hamilton paths. Hence, control data that controls the 3D printer head 222 is generated on the basis of a tool path that is generated on the basis of a Hamilton path selected by a user. Therefore, a tool path for outputting a three-dimensional formed object with physical properties specified by the path selection policy may be generated in closer accordance with the wishes of the user. Thus, a tool path for outputting a three-dimensional formed object in a 3D printer more appropriately may be generated.

Moreover, according to the three-dimensional object-manufacturing apparatus 1, when a Hamilton path is being searched for, if the voxel model is a voxel model for which a Hamilton path cannot be computed, the voxels are divided into subvoxels. Thus, because voxel data can be converted into voxel data for which a Hamilton path can be computed, a tool path for outputting a three-dimensional formed object in a 3D printer more appropriately may be assuredly generated.

Third Embodiment

Now, a third embodiment of the present invention is described. The three-dimensional object-manufacturing apparatus 1 according to the third embodiment is equipped with a similar hardware structure to the three-dimensional object-manufacturing apparatus 1 according to the first embodiment, but differs in parts of the functional structures and the three-dimensional object-manufacturing processing. To be specific, in the three-dimensional object-manufacturing apparatus 1 according to the first embodiment, if a Hamilton path that traces through each voxel represented by a voxel model cannot be computed, all the voxels of the voxel model are always divided into subvoxels. However, in the three-dimensional object-manufacturing apparatus 1 according to the third embodiment, just a necessary portion of the voxel model according to a user selection may be divided into subvoxels. Below, mainly parts that are different from the first embodiment are described.

—Functional Structures of the Three-Dimensional Object Manufacturing Apparatus 1—

Figure 6:
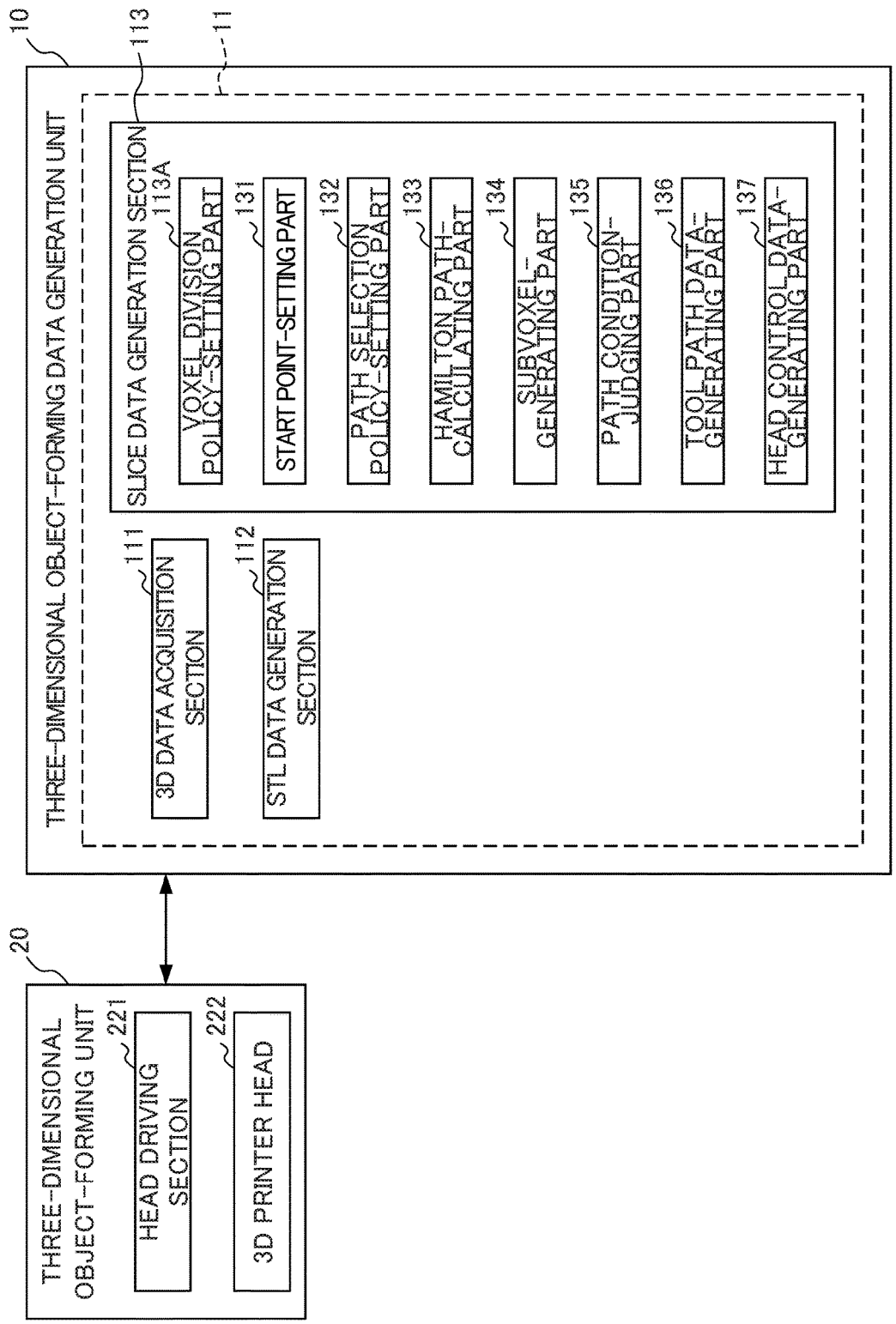
FIG. 6 is a block diagram illustrating functional structures of the three-dimensional object-manufacturing apparatus according to a third embodiment.

FIG. 6 is a block diagram illustrating functional structures of the three-dimensional object-manufacturing apparatus 1 according to the third embodiment. As shown in FIG. 6, the three-dimensional object-forming data generation unit 10 of the three-dimensional object-manufacturing apparatus 1 is equipped with the 3D data acquisition section 111, the STL data generation section 112 and the slice data generation section 113, and the three-dimensional object-forming unit 20 is equipped with the head driving section 221 and the 3D printer head 222. Functional structures thereof are the same as functional structures in the first embodiment illustrated in FIG. 2, apart from functional structures of a voxel division policy-setting part 113A, the Hamilton path-calculating part 133 and the subvoxel-generating part 134 of the slice data generation section 113.

In the third embodiment, the voxel division policy-setting part 113A of the slice data generation section 113 sets a policy for dividing voxels into subvoxels (a voxel division policy) for when it is judged that a Hamilton path cannot be computed. In the present embodiment, the meaning of the term "voxel division policy" includes setting either a policy of dividing all voxels of a voxel model into subvoxels or a policy of dividing voxels of a portion of a voxel model for which a Hamilton path cannot be computed into subvoxels. In the present embodiment, the voxel division policy-setting part 113A sets the voxel division policy by receiving settings of the voxel division policy from a user. When the voxel division policy-setting part 113A sets the voxel division policy, the voxel division policy may be designated in advance by a user when a three-dimensional formed object is to be manufactured and the settings may be retained, or the user may be prompted each time it is determined that a Hamilton path cannot be computed and the user may designate and set successive voxel division policies.

On the basis of STL data generated by the STL data generation section 112, the Hamilton path-calculating part 133 generates data of a voxel model representing internal structure of the three-dimensional formed object. Then, the Hamilton path-calculating part 133 computes a Hamilton path that traces through each voxel of the generated voxel model. If the Hamilton path-calculating part 133 determines that a Hamilton path tracing through each voxel represented by the voxel model cannot be computed (that is, it is not possible to trace through each voxel in a single pass), the Hamilton path-calculating part 133 outputs a processing request to the subvoxel-generating part 134 to divide voxels into subvoxels. Depending on the user's policy for dividing voxels into subvoxels (the voxel division policy), the Hamilton path-calculating part 133 outputs either a processing request to divide all the voxels of the voxel model into subvoxels or a processing request to divide voxels of a portion of the voxel model for which a Hamilton path cannot be computed into subvoxels.

When a processing request to divide voxels into subvoxels is inputted from the Hamilton path-calculating part 133, the subvoxel-generating part 134 executes processing to divide the voxels into subvoxels and outputs the processing results to the Hamilton path-calculating part 133 to serve as new voxel data. In the present embodiment, depending on the voxel division policy set by the user, the subvoxel-generating part 134 divides all the voxels of the voxel model in four to form the subvoxels, or the subvoxel-generating part 134 divides the voxels of a portion of the voxel model for which a Hamilton path cannot be computed in four to form the subvoxels. When all the voxels of a voxel model are divided into subvoxels, a Hamilton path may be more assuredly found, but when only the voxels of a portion of a voxel model for which a Hamilton path cannot be computed are divided into subvoxels, a Hamilton path may be found efficiently.

—Operation—

Figure 7:
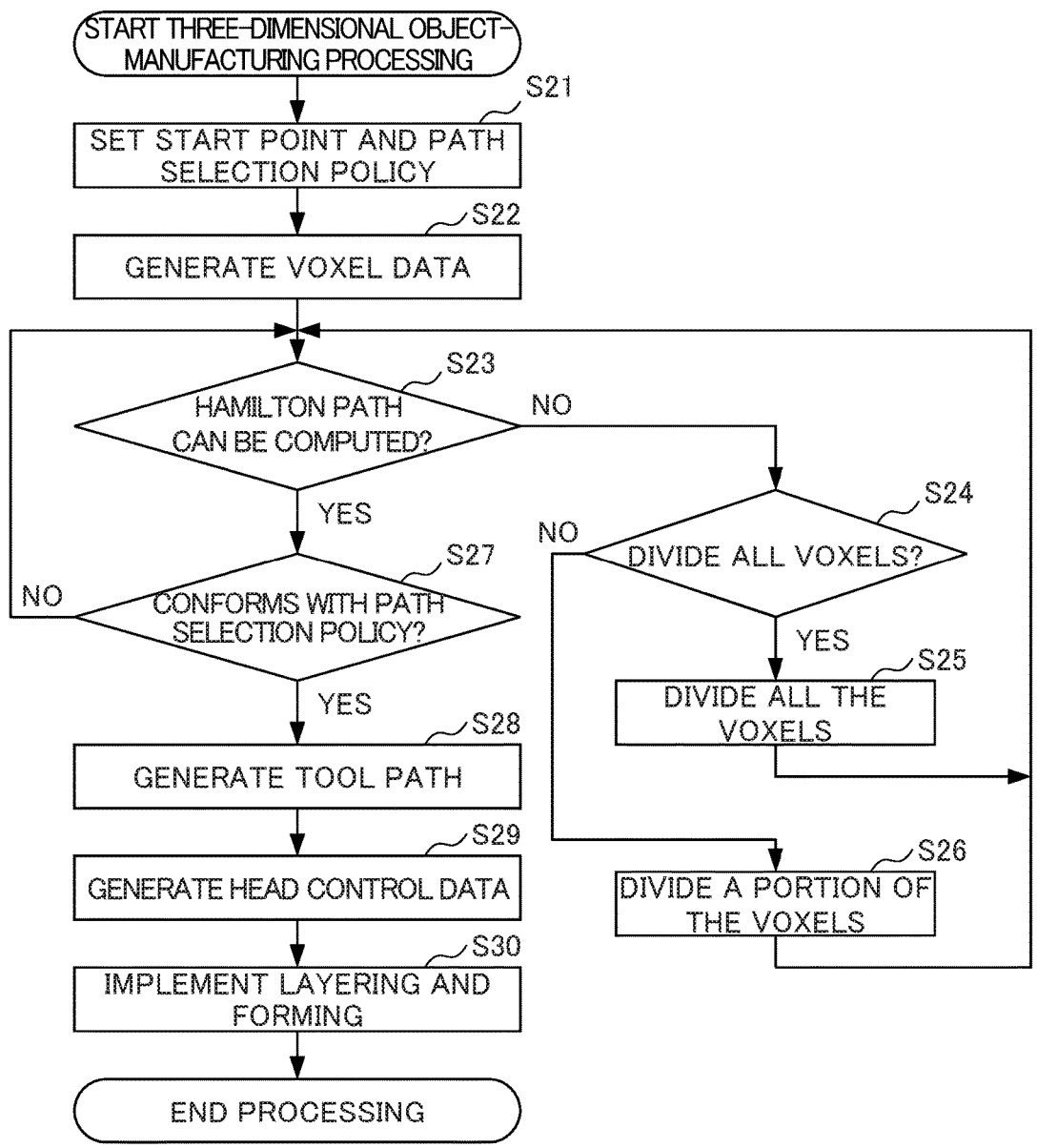
FIG. 7 is a flowchart depicting a flow of three-dimensional object-manufacturing processing that is executed by the three-dimensional object-manufacturing apparatus according to the third embodiment.

Now, operations of the three-dimensional object-manufacturing apparatus 1 according to the third embodiment are described. FIG. 7 is a flowchart depicting a flow of three-dimensional object-manufacturing processing that is executed by the three-dimensional object-manufacturing apparatus 1 according to the third embodiment. The processing of step S21 to step S23 in FIG. 7 is the same as the processing of step S1 to step S3 in FIG. 4.

In step S24, the Hamilton path-calculating part 133 makes a determination as to whether a policy of dividing all voxels of a voxel model into subvoxels has been set as the voxel division policy. If the policy of dividing all voxels of a voxel model into subvoxels has been set as the voxel division policy, the result of the determination in step S24 is "YES" and the processing advances to step S25. Alternatively, if the policy of dividing all voxels of a voxel model into subvoxels has not been set as the voxel division policy (that is, a policy of dividing the voxels of a portion of a voxel model for which a Hamilton path cannot be computed into subvoxels has been set), the result of the determination in step S24 is "NO" and the processing advances to step S26.

In step S25, the subvoxel-generating part 134 executes processing to divide all the voxels of the voxel model into subvoxels and outputs the processing results to the Hamilton path-calculating part 133 to serve as new voxel data. After step S25, the processing returns to step S23. In step S26, the subvoxel-generating part 134 executes processing to divide the voxels of a portion of the voxel model for which a Hamilton path cannot be computed (a portion of the voxels) into subvoxels and outputs the processing results to the Hamilton path-calculating part 133 to serve as new voxel data. After step S26, the processing returns to step S23. The processing in step S27 to step S30 is the same as the processing of step S5 to step S8 in FIG. 4.

As described above, according to the three-dimensional object-manufacturing apparatus 1 relating to the present embodiment, a Hamilton path that renders a voxel model representing internal structure of a three-dimensional formed object in one pass is searched for, and when a Hamilton path that conforms with a set path selection policy is found, control data that controls the 3D printer head 222 is generated on the basis of a tool path that is generated on the basis of this Hamilton path. Therefore, a tool path for outputting a three-dimensional formed object with physical properties specified by the path selection policy may be generated. Thus, a tool path for outputting a three-dimensional formed object in a 3D printer more appropriately may be generated.

Moreover, according to the three-dimensional object-manufacturing apparatus 1, when a Hamilton path is being searched for, if the voxel model is a voxel model for which a Hamilton path cannot be computed, then depending on the voxel division policy, either all the voxels of the voxel model or the voxels of a portion for which a Hamilton path cannot be computed are divided into subvoxels. Thus, because, in accordance with a user setting, the whole or a portion of voxel data can be converted into voxel data for which a Hamilton path can be computed, a tool path for outputting a three-dimensional formed object in a 3D printer more appropriately may be assuredly generated.

Fourth Embodiment

Now, a fourth embodiment of the present invention is described. The three-dimensional object-manufacturing apparatus 1 according to the fourth embodiment is equipped with a similar hardware structure to the three-dimensional object-manufacturing apparatus 1 according to the first embodiment, but differs in parts of the functional structures and the three-dimensional object-manufacturing processing. To be specific, in the three-dimensional object-manufacturing apparatus 1 according to the first embodiment, when a voxel has been divided into subvoxels, all the subvoxels belonging to that voxel are filled with the forming material. However, in the three-dimensional object-manufacturing apparatus 1 according to the fourth embodiment, when a voxel has been divided into subvoxels, internal structure of the voxel may be altered by filling only some of the subvoxels belonging to that voxel with the forming material. Thus, desired physical properties may be realized. For example, in the three-dimensional object-manufacturing apparatus 1 according to the present embodiment, it is possible to design local or overall properties of a three-dimensional object such as optical properties (transparency, the color of transmitted light and the like), mechanical properties (softness, hardness, elasticity, compressibility, tensile strength, compressive strength and the like), acoustic and vibration properties, electromagnetic properties (conductivity, locality, anisotropy and the like), and thermal properties (thermal insulation and the like). Below, mainly parts that are different from the first embodiment are described.

—Functional Structures of the Three-Dimensional Object Manufacturing Apparatus 1—

Figure 8:
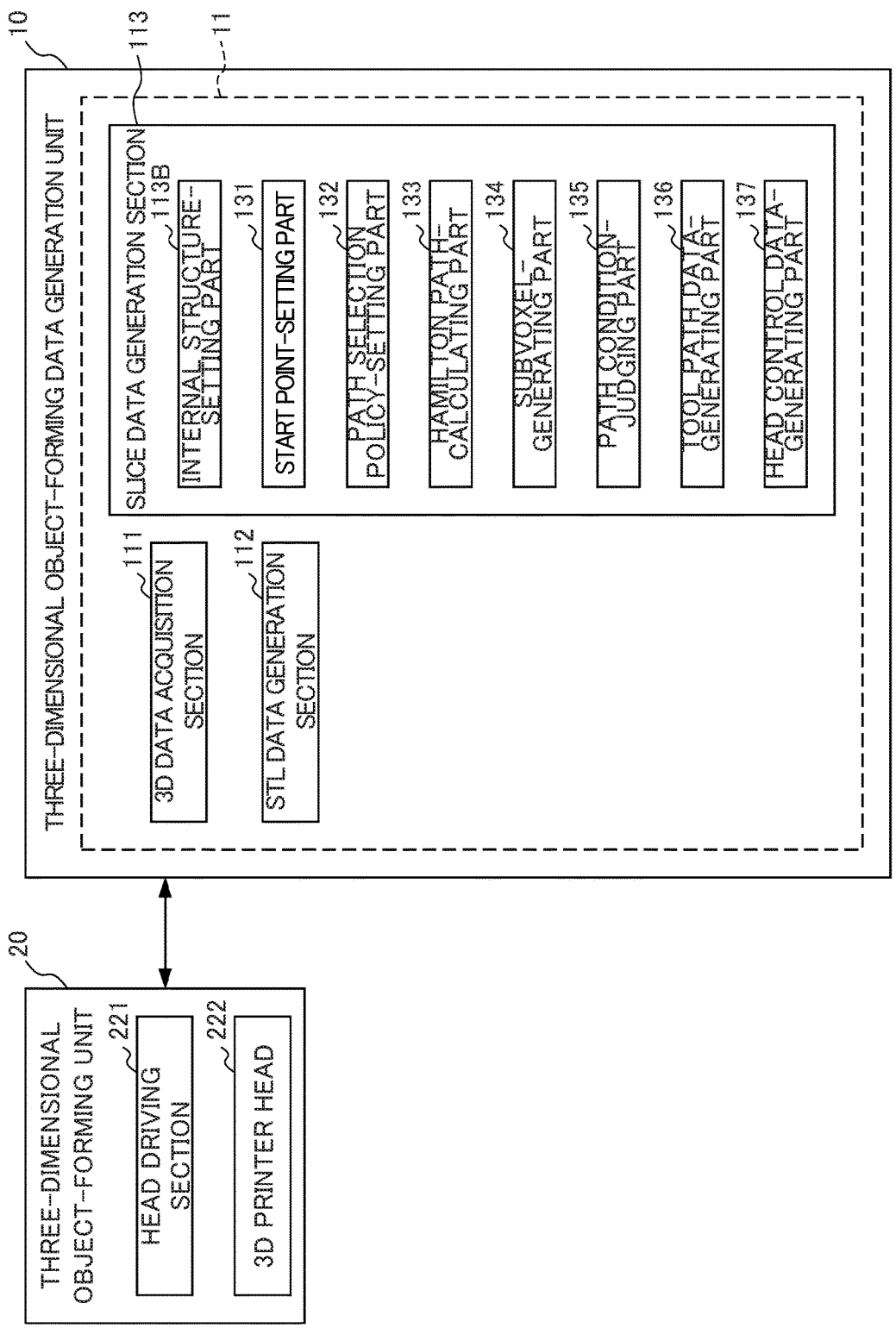
FIG. 8 is a block diagram illustrating functional structures of the three-dimensional object-manufacturing apparatus according to a fourth embodiment.

FIG. 8 is a block diagram illustrating functional structures of the three-dimensional object-manufacturing apparatus 1 according to the fourth embodiment. As shown in FIG. 8, in the three-dimensional object-manufacturing apparatus 1, the slice data generation section 113 is equipped with an internal structure-setting part 113B, and with the start point-setting part 131, the path selection policy-setting part 132, the Hamilton path-calculating part 133, the subvoxel-generating part 134, the path condition-judging part 135, the tool path data-generating part 136 and the head control data-generating part 137. Functional structures of these apart from the internal structure-setting part 113B, the Hamilton path-calculating part 133, the subvoxel-generating part 134, the path condition-judging part 135 and the tool path data-generating part 136 of the slice data generation section 113 are similar to functional structures in the first embodiment illustrated in FIG. 2.

In the fourth embodiment, the internal structure-setting part 113B of the slice data generation section 113 sets a policy for defining internal structure when a voxel has been divided into subvoxels (an internal structure definition policy). The internal structure definition policy may define the interior of a voxel by a filling proportion of subvoxels, and may add conditions relating to the positions of the subvoxels that are filled. For example, if a voxel is divided in half in three ways—length, width and height—the voxel is divided into eight subvoxels. Of these eight subvoxels, the filling proportion may be set in nine steps, from 0/8 to 8/8, depending on how many of the subvoxels are to be filled with the forming material. A physical property of a three-dimensional formed object that is specified by altering the filling proportion may be softness, transparency, weight or the like. Even with the same filling proportion, the internal structure that can be provided to the three-dimensional formed object changes depending on which of the eight subvoxels are filled with the forming material. That is, if at least one subvoxel in each of the six faces of the voxel is filled, connection with adjacent voxels is possible, but if no subvoxel in a face is filled, connection with an adjacent voxel is not possible. Therefore, the meaning of "conditions relating to the positions of the subvoxels that are filled" includes a condition that sets connection relationships with adjacent voxels.

The path condition-judging part 135 judges whether or not a Hamilton path computed by the Hamilton path-calculating part 133 conforms with the path selection policy set by the path selection policy-setting part 132 and the internal structure definition policy set by the internal structure-setting part 113B. To be specific, the path condition-judging part 135 judges whether or not the Hamilton path computed by the Hamilton path-calculating part 133 conforms with directions of the tool path set in the path selection policy and whether or not the Hamilton path conforms with the filling proportion of subvoxels in the voxels, the condition relating to the positions of the subvoxels that are filled and the like. Then, if the path condition-judging part 135 judges that the Hamilton path computed by the Hamilton path-calculating part 133 does not conform with the tool path set in the path selection policy or with the filling proportion of subvoxels in the voxels, the condition relating to the positions of the subvoxels that are filled and the like, the path condition-judging part 135 outputs a request to the Hamilton path-calculating part 133 to recompute the Hamilton path. By this processing, a single Hamilton path conforming with the path selection policy and the internal structure definition policy is found.

On the basis of the Hamilton path that has been judged to conform with the path selection policy and the internal structure definition policy by the path condition-judging part 135, the tool path data-generating part 136 generates slice data representing a tool path of the 3D printer head 222. The slice data generated by the tool path data-generating part 136 represents a Hamilton path that satisfies path selection conditions and the internal structure definition policy and that can trace through the voxels in a single pass.

Thus, in the three-dimensional object-manufacturing apparatus 1 according to the present embodiment, which of the subvoxels of a voxel that has been divided into subvoxels are to be filled with the forming material is defined on the basis of the internal structure definition policy. Therefore, a three-dimensional formed object may be manufactured with an internal structure featuring a physical property desired by a user.

—Operation—

Now, operations of the three-dimensional object-manufacturing apparatus 1 according to the fourth embodiment are described. FIG. 9 is a flowchart depicting a flow of three-dimensional object-manufacturing processing that is executed by the three-dimensional object-manufacturing apparatus 1 according to the fourth embodiment. In step S31, the internal structure-setting part 113B sets the internal structure definition policy. The processing of step S32 to step S35 is the same as the processing of step S1 to step S4 in FIG. 4.

In step S36, the path condition-judging part 135 makes a determination as to whether the Hamilton path computed by the Hamilton path-calculating part 133 conforms with the path selection policy set by the path selection policy-setting part 132 and the internal structure definition policy set by the internal structure-setting part 113B. If the Hamilton path computed by the Hamilton path-calculating part 133 does not conform with the path selection policy set by the path selection policy-setting part 132 or the internal structure definition policy set by the internal structure-setting part 113B, the result of the determination in step S36 is "NO" and the processing returns to step S34. Alternatively, if the Hamilton path computed by the Hamilton path-calculating part 133 conforms with the path selection policy set by the path selection policy-setting part 132 and the internal structure definition policy set by the internal structure-setting part 113B, the result of the determination in step S36 is "YES" and the processing advances to step S37. The processing of step S37 to step S39 is the same as the processing of step S6 to step S8 in FIG. 4.

As described above, according to the three-dimensional object-manufacturing apparatus 1 relating to the present embodiment, a Hamilton path that renders a voxel model representing the internal structure of a three-dimensional formed object in one pass is searched for, and when a Hamilton path that conforms with the set path selection policy is found, control data that controls the 3D printer head 222 is generated on the basis of a tool path that is generated on the basis of this Hamilton path. Therefore, a tool path for outputting a three-dimensional formed object with physical properties specified by the path selection policy may be generated. Thus, a tool path for outputting a three-dimensional formed object in a 3D printer more appropriately may be generated.

Moreover, according to the three-dimensional object-manufacturing apparatus 1, when a Hamilton path is being searched for, if the voxel model is a voxel model for which a Hamilton path cannot be computed, the voxels are divided into subvoxels. Thus, because voxel data can be converted into voxel data for which a Hamilton path can be computed, a tool path for outputting a three-dimensional formed object in a 3D printer more appropriately may be assuredly generated.

Furthermore, according to the three-dimensional object-manufacturing apparatus 1, a Hamilton path is searched for in which, when the subvoxels are filled with the forming material, a filling proportion of the subvoxels conforms with the set internal structure definition policy and the Hamilton path conforms with a condition relating to the positions of the subvoxels that are filled. Control data that controls the 3D printer head 222 is generated on the basis of a tool path that is generated on the basis of this Hamilton path. Thus, internal structure of the voxels may be altered and a three-dimensional object that provides a desired physical property may be manufactured.

Variant Example 1

In the embodiments described above, voxels or subvoxels may be filled with two or more kinds of forming material and three-dimensional objects with various properties may be realized. In such a case, three-dimensional objects that provide various desired properties may be manufactured by designating the forming material with which each voxel or subvoxel is to be filled or designating positions of the voxels or subvoxels that are to be filled with each forming material. For example, an optical property of a three-dimensional object may be realized by designating voxels or subvoxels to be filled with a forming material with high transparency and voxels or subvoxels to be filled with a forming material with low transparency. Further, a mechanical property relating to softness of a three-dimensional object, or an acoustic or vibration property or the like, may be realized by designating voxels or subvoxels to be filled with a forming material with high hardness and voxels or subvoxels to be filled with a forming material with low hardness. Further again, an electrical circuit may be formed inside a three-dimensional object or the like, or an electromagnetic property of a three-dimensional object (conductivity, locality, anisotropy or the like) may be realized, by designating voxels or subvoxels to be filled with a non-conductive forming material and voxels or subvoxels to be filled with a conductive forming material. Further yet, a thermal property of a three-dimensional object (thermal insulation or the like) may be realized by designating voxels or subvoxels to be filled with a forming material with high insulativity and voxels or subvoxels to be filled with a forming material with low insulativity.

Variant Example 2

In the embodiments described above, by electronic components being embedded inside the three-dimensional formed object, a three-dimensional object that is equipped with a sensing function (sound or temperature sensing or the like), an active function (an electronic processing function or the like for light emission, communication or the like) or the like may be designed and manufactured. In such a case, an electronic component that has already been manufactured may be embedded or an electronic component may be manufactured by ejection of a conductive forming material during forming in the three-dimensional object-manufacturing apparatus 1.

Variant Example 3

In the embodiments described above, if it is necessary to divide voxels into subvoxels in a state in which nozzle properties of the 3D printer head 222 are set for a minimum voxel size, the size of the three-dimensional formed object that is manufactured may be increased and a state in which all the voxels in the voxel model are converted to subvoxels is possible. That is, in this state the subvoxels in all of the voxels are formed by the original size of the voxels being used as the size of the subvoxels and the size of the voxels being increased. Thus, the voxel model may be converted to subvoxels and the three-dimensional object manufactured while maintaining the balance of the shape of the whole object.

Variant Example 4

In the embodiments described above, if it is necessary to divide voxels into subvoxels in a state in which nozzle properties of the 3D printer head 222 are set for the minimum voxel size, just required portions of the voxel model may be locally enlarged and a state in which the voxels of a portion of the voxel model are converted to subvoxels is possible. Thus, the voxels of required portions may be converted to subvoxels and the three-dimensional object may be manufactured while maintaining the size of the whole object.

Variant Example 5

In the embodiments described above, directions of the tool path set in the path selection policy may be set as priorities for selecting the three axial directions (the horizontal directions and the vertical direction) at branching points of the tool path. To be specific, priority levels for selecting the three axial directions (the horizontal directions and the vertical direction) at branching points of the tool path are set for all the voxels or subvoxels or for a portion of the voxels or subvoxels. Hence, the priority levels may be used when making a determination as to whether a Hamilton path that is found conforms with the path selection policy or may be used as an evaluation standard for selecting an optimum path from a list of Hamilton paths. Therefore, when a determination is being made as to whether a found Hamilton path conforms with the path selection policy, a degree to which the tool path at predetermined voxels or subvoxels conforms with the set priority levels of the three axial directions, or the like, may be used as an evaluation standard for making the determination. Further, a degree to which the tool path at predetermined voxels or subvoxels in each of Hamilton paths stored in a candidates list conforms with the set priority levels of the three axial directions, or the like, may be presented as an evaluation standard for selecting the optimum path.

Variant Example 6

In the fourth embodiment, connectedness between adjacent voxels may be set as a condition relating to the positions of the subvoxels that are filled, which is set in the internal structure definition policy. To be specific, proportions that are connected in the three axial directions (the horizontal directions and the vertical direction) may be set as the connectedness between adjacent voxels (that is, anisotropy of connections). For example, proportions (indices representing anisotropy or isotropy) that are connected in the three axial directions (the horizontal directions and the vertical direction) are set for all the voxels or subvoxels or for a portion of the voxels or subvoxels. Hence, these proportions may be used when making a determination as to whether a Hamilton path that is found conforms with the path selection policy or may be used as an evaluation standard for selecting an optimum path from a list of Hamilton paths. Therefore, when a determination is being made as to whether a found Hamilton path conforms with the internal structure definition policy, a degree to which the tool path at predetermined voxels or subvoxels conforms with the set anisotropy of connections, or the like, may be used as an evaluation standard for making the determination. Further, a degree to which the tool path at predetermined voxels or subvoxels in each of Hamilton paths stored in a candidates list conforms with the set anisotropy of connections, or the like, may be presented as an evaluation standard for selecting the optimum path.

The three-dimensional object-manufacturing apparatus 1 configured as described above is equipped with the Hamilton path-calculating part 133, the subvoxel-generating part 134, the tool path data-generating part 136 and the three-dimensional object-forming unit 20. The Hamilton path-calculating part 133 generates, on the basis of three-dimensional shape data representing the shape of a three-dimensional object, a voxel model representing internal structure for forming the three-dimensional object. The Hamilton path-calculating part 133 judges whether or not a Hamilton path can be established for the generated voxel model. When it is judged by the Hamilton path-calculating part 133 that a Hamilton path cannot be established for the voxel model, the subvoxel-generating part 134 divides the voxels of the voxel model to generate subvoxels. The Hamilton path-calculating part 133 establishes a Hamilton path for the voxel model. The tool path data-generating part 136 generates a tool path for forming a forming material on the basis of the Hamilton path established by the Hamilton path-calculating part 133. The three-dimensional object-forming unit 20 implements the forming of the three-dimensional object on the basis of the tool path generated by the tool path data-generating part 136. Thus, when a Hamilton path that renders a voxel model representing the internal structure of a three-dimensional formed object in one pass cannot be established, the voxels are divided into subvoxels, a Hamilton path is established, and the three-dimensional object is formed on the basis of a tool path that is generated on the basis of this Hamilton path. Therefore, various voxel models may be converted to voxel models for which a Hamilton path can be established. Thus, a tool path for outputting a three-dimensional formed object in a 3D printer more appropriately may be generated.

The three-dimensional object-manufacturing apparatus 1 is further provided with the path selection policy-setting part 132. The path selection policy-setting part 132 makes a setting relating to a direction of the tool path for at least a portion of the three-dimensional object. The tool path data-generating part 136 establishes the tool path on the basis of the direction of the tool path set by the path-setting unit. Hence, the three-dimensional formed object may be manufactured with physical properties in accordance with the setting relating to the direction of the tool path.

The tool path data-generating part 136 generates a tool path including a component in directions along a plane in which the three-dimensional object is formed and a component in a direction orthogonal to the plane. Thus, physical properties of the three-dimensional object that is manufactured may be appropriately specified.

The subvoxel-generating part 134 divides all of the voxels contained in a voxel model into subvoxels. Accordingly, a Hamilton path may be found more assuredly.

Alternatively, the subvoxel-generating part 134 divides a portion of the voxels contained in a voxel model into subvoxels. Accordingly, an efficient Hamilton path may be found.

The three-dimensional object-manufacturing apparatus 1 is further provided with the internal structure-setting part 113B. The internal structure-setting part 113B sets internal structures of voxels that are divided into subvoxels. The tool path data-generating part 136 generates the tool path on the basis of the internal structures of the voxels set by the internal structure-setting unit. Accordingly, internal structures of the voxels may be altered and a three-dimensional object provided with a desired physical property may be manufactured.

The internal structure-setting part 113B specifies a portion of the subvoxels of the voxels to be filled with the forming material. Thus, three-dimensional objects provided with various desired properties may be manufactured.

The internal structure-setting part 113B sets a filling proportion for the forming material in the voxels. The tool path data-generating part 136 generates a tool path from a combination of filling positions of the subvoxels that produces the filling proportion set by the internal structure-setting part 113B. Accordingly, a three-dimensional object provided with a physical property defined by the filling proportion of the voxels, such as softness of the three-dimensional object or the like, may be realized appropriately.

The internal structure-setting part 113B sets positions to be filled with the forming material in the voxels. The tool path data-generating part 136 generates a tool path that fills subvoxels at the filling positions set by the internal structure-setting part 113B with the forming material. Accordingly, a three-dimensional object may be manufactured with connecting structures of the subvoxels in the three-dimensional object being concretely defined.

When setting the internal structure, the internal structure-setting part 113B sets a condition relating to connectedness between the voxels and adjacent voxels. Accordingly, a Hamilton path that satisfies the set condition relating to connectedness between adjacent voxels may be appropriately established.

The three-dimensional object-forming unit 20 forms a three-dimensional object by filling the voxels or subvoxels with plural forming materials. Thus, three-dimensional objects provided with various desired properties may be manufactured.

The present invention may be suitably modified, improved or the like within a scope that provides the effects of the present invention and is not limited to the embodiments described above. For example, in the embodiments described above, when data of a voxel model is generated from STL data, the size of the three-dimensional formed object may be finely adjusted within sizes from one to plural voxels and the data of the voxel model generated such that the surface and the internal structure are more appropriately connected. The above embodiment and variant examples may be combined as appropriate to embody the present invention.

The processing in the above embodiment may be executed by hardware or software. That is, provided functions that can execute the processing described above are provided at the three-dimensional object-manufacturing apparatus 1, functional configurations and hardware configurations for realizing the functions are not limited to the examples described above. In a case in which the above processing is to be executed by software, a program configuring the software is installed from a network or a storage medium into a computer.

A storage medium storing a program may be constituted by a removable medium that is distributed separately from the main body of the equipment, a storage medium that is incorporated in the main body of the equipment beforehand, or the like. The removable medium is constituted by, for example, a magnetic disc, an optical disc, a magneto-optical disc or the like. An optical disk is constituted by, for example, a CD-ROM (Compact Disc-Read Only Memory), a DVD (Digital Versatile Disc), a Blu-ray Disc (registered trademark) or the like. A magneto-optical disk is constituted by an MD (Mini-Disk) or the like. A storage medium that is incorporated in the main body of the equipment is constituted by, for example, a ROM, a hard disc or the like in which the program is stored.

EXPLANATION OF REFERENCE NUMERALS

1 Three-dimensional object-manufacturing apparatus, 10 Three-dimensional object-forming data generation unit, 11

CPU, 12 ROM, 13 RAM, 14 Input section, 15 Output section, 16 Storage section, 17 Communications section, 111 3D data acquisition section, 112 STL data generation section, 113 Slice data generation section, 131 Start point-setting part, 132 Path selection policy-setting part, 133 Hamilton path-calculating part, 134 Subvoxel-generating part, 135 Path condition-judging part, 136 Tool path data-generating part, 137 Head control data-generating part, 113A voxel division policy-setting part, 113B Internal structure-setting part, 20 Three-dimensional object-forming unit, 221 Head driving section, 222 3D printer head.

The invention claimed is:

1. A three-dimensional object-manufacturing apparatus comprising:
   a head that ejects a forming material; and
   a processor, wherein the processor performs:
      voxel model-generating processing that, based on three-dimensional shape data representing a shape of a three-dimensional object, generates a voxel model representing an internal structure for forming the three-dimensional object;
      judging processing that judges whether a Hamilton path can be established for the voxel model generated in the voxel model-generating processing;
      subvoxel-generating processing that, when it is judged in the judging processing that a Hamilton path cannot be established for the voxel model, divides voxels of the voxel model to generate subvoxels;
      Hamilton path-establishing processing that establishes a Hamilton path for the voxel model;
      tool path-generating processing that generates a tool path for forming the forming material based on the Hamilton path established in the Hamilton path-establishing processing; and
      path-setting processing that makes a setting relating to a direction of the tool path for at least a portion of the three-dimensional object, the direction of the tool path being associated with at least one of tensile and compression strength and a likelihood of cracking, and the tensile and compression strength and the likelihood of cracking being based on a direction in which the forming material is formed,
   wherein the head implements forming of the three-dimensional object based on the tool path generated in the tool path-generating processing, and
   wherein the tool path-generating processing generates the tool path based on the direction of the tool path set in the path-setting processing.

2. The three-dimensional object-manufacturing apparatus according to claim 1, wherein the tool path generated in the tool path-generating processing includes a component in a direction along a plane in which the three-dimensional object is formed and a component in a direction orthogonal to the plane.

3. The three-dimensional object-manufacturing apparatus according to claim 1, wherein the subvoxel-generating processing divides all the voxels contained in the voxel model into subvoxels.

4. The three-dimensional object-manufacturing apparatus according to claim 1, wherein the subvoxel-generating processing divides a portion of the voxels contained in the voxel model into subvoxels.

5. The three-dimensional object-manufacturing apparatus according to claim 1, wherein:
   the processor further performs internal structure-setting processing that sets an internal structure of the voxels divided into subvoxels, and
   the tool path-generating processing generates the tool path based on the internal structure of the voxels set in the internal structure-setting processing.

6. The three-dimensional object-manufacturing apparatus according to claim 5, wherein the internal structure-setting processing sets a portion of the subvoxels in the voxels to be filled with the forming material.

7. The three-dimensional object-manufacturing apparatus according to claim 5, wherein:
   the internal structure-setting processing sets a filling proportion of the forming material in the voxels; and
   the tool path-generating processing generates the tool path from a combination of filling positions of the subvoxels that produces the filling proportion set in the internal structure-setting processing.

8. The three-dimensional object-manufacturing apparatus according to claim 5, wherein:
   the internal structure-setting processing sets filling positions of the forming material in the voxels; and
   the tool path-generating processing generates the tool path to fill subvoxels at the filling positions set in the internal structure-setting processing with the forming material.

9. The three-dimensional object-manufacturing apparatus according to claim 5, wherein, when the internal structure-setting processing is setting the internal structure, the internal structure-setting processing sets a condition relating to connectedness between adjacent voxels.

10. The three-dimensional object-manufacturing apparatus according to claim 1, wherein the three-dimensional object-forming processing forms the three-dimensional object by filling the voxels or subvoxels with a plurality of forming materials.

11. A three-dimensional object-manufacturing method performed by a three-dimensional object-manufacturing apparatus under control of a processor, the apparatus comprising the processor and a head that ejects a forming material, and the method comprising:
   voxel model-generating processing that, based on three-dimensional shape data representing a shape of a three-dimensional object, generates a voxel model representing an internal structure for forming the three-dimensional object;
   judging processing that judges whether a Hamilton path can be established for the voxel model generated in the voxel model-generating processing;
   subvoxel-generating processing that, when it is judged in the judging processing that a Hamilton path cannot be established for the voxel model, divides voxels of the voxel model to generate subvoxels;
   Hamilton path-establishing processing that establishes a Hamilton path for the voxel model;
   tool path-generating processing that generates a tool path for forming the forming material based on the Hamilton path established in the Hamilton path-establishing processing; and
   path-setting processing that makes a setting relating to a direction of the tool path for at least a portion of the three-dimensional object, the direction of the tool path being associated with at least one of tensile and compression strength and a likelihood of cracking, and the tensile and compression strength and the likelihood of cracking being based on a direction in which the forming material is formed,
   wherein the head implements forming of the three-dimensional object based on the tool path generated in the tool path-generating processing, and wherein the tool path is generated in the tool path-generating processing based on the direction of the tool path set in the path-setting processing.

12. A non-transitory computer readable storage medium having stored therein a program that is executable by a processor of a three-dimensional object-manufacturing apparatus that manufactures a three-dimensional object, the apparatus comprising the processor and a head that ejects a forming material, and the program controlling the processor to perform:

voxel model-generating processing that, based on three-dimensional shape data representing a shape of the three-dimensional object, generates a voxel model representing an internal structure for forming the three-dimensional object;

judging processing that judges whether a Hamilton path can be established for the voxel model generated in the voxel model-generating processing;

subvoxel-generating processing that, when it is judged in the judging processing that a Hamilton path cannot be established for the voxel model, divides voxels of the voxel model to generate subvoxels;

Hamilton path-establishing processing that establishes a Hamilton path for the voxel model;

tool path-generating processing that generates a tool path for forming the forming material based on the Hamilton path established in the Hamilton path-establishing processing;

path-setting processing that makes a setting relating to a direction of the tool path for at least a portion of the three-dimensional object, the direction of the tool path being associated with at least one of tensile and compression strength and a likelihood of cracking, and the tensile and compression strength and the likelihood of cracking being based on a direction in which the forming material is formed; and three-dimensional object formation processing that controls the head to implement forming of the three-dimensional object based on the tool path generated in the tool path-generating processing, wherein the tool path-generating processing generates the tool path based on the direction of the tool path set in the path-setting processing.

* * * * *